(12) United States Patent
Zhou et al.

(10) Patent No.: US 10,580,204 B2
(45) Date of Patent: Mar. 3, 2020

(54) METHOD AND DEVICE FOR IMAGE POSITIONING BASED ON 3D RECONSTRUCTION OF RAY MODEL

(71) Applicant: Tsinghua University, Beijing (CN)

(72) Inventors: Jie Zhou, Beijing (CN); Lei Deng, Beijing (CN); Yueqi Duan, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 137 days.

(21) Appl. No.: 16/066,168

(22) PCT Filed: Dec. 30, 2016

(86) PCT No.: PCT/CN2016/113804
§ 371 (c)(1),
(2) Date: Jun. 26, 2018

(87) PCT Pub. No.: WO2017/114507
PCT Pub. Date: Jul. 6, 2017

(65) Prior Publication Data
US 2019/0005718 A1 Jan. 3, 2019

(30) Foreign Application Priority Data
Dec. 31, 2015 (CN) .......................... 2015 1 1026787

(51) Int. Cl.
*G06T 17/00* (2006.01)
*G06T 7/55* (2017.01)
(Continued)

(52) U.S. Cl.
CPC .............. *G06T 17/005* (2013.01); *G06K 9/46* (2013.01); *G06K 9/6211* (2013.01); *G06T 7/55* (2017.01);
(Continued)

(58) Field of Classification Search
CPC .......... G06K 9/6211; G06K 9/46; G06T 7/80; G06T 7/55; G06T 2207/10028; G06T 2207/20072; G06T 2207/30244
See application file for complete search history.

(56) References Cited

U.S. PATENT DOCUMENTS

| 7,187,809 B2 * | 3/2007 | Zhao .................. G06K 9/00214 382/285 |
| 2009/0232355 A1 | 9/2009 | Minear et al. |

(Continued)

FOREIGN PATENT DOCUMENTS

| CN | 102074015 | 5/2011 |
| CN | 102075686 | 5/2011 |

(Continued)

OTHER PUBLICATIONS

WIPO, ISR for PCT/CN2016/113804, Mar. 30, 2017.

*Primary Examiner* — Brenda C Bernardi
(74) *Attorney, Agent, or Firm* — Hodgson Russ LLP (57) ABSTRACT

The present disclosure provides a method comprising: acquiring a plurality of images of a plurality of scenes in advance, and performing feature extraction on the plurality of images respectively, to obtain a corresponding plurality of feature point sets; performing pairwise feature matching on the plurality of images, generating a corresponding eigen matrix according to the pairwise feature matching, and performing noise processing on the eigen matrix; performing 3D reconstruction according to the feature matching and the noise-processed eigen matrix and based on a ray model, to generate a 3D feature point cloud and a reconstructed camera pose set; acquiring a query image, and performing feature extraction on the query image to obtain a corresponding 2D feature point set; and performing image positioning according to the 2D feature point set, the 3D feature (Continued)

point cloud and the reconstructed camera pose set and based on a positioning attitude image optimization framework.

15 Claims, 6 Drawing Sheets

(51) Int. Cl.
    *G06T 7/80*     (2017.01)
    *G06K 9/46*     (2006.01)
    *G06K 9/62*     (2006.01)

(52) U.S. Cl.
    CPC ...... *G06T 7/80* (2017.01); *G06T 2207/10028* (2013.01); *G06T 2207/20072* (2013.01); *G06T 2207/30244* (2013.01)

(56) References Cited

U.S. PATENT DOCUMENTS

2015/0371385 A1* 12/2015 Zhou .................. G06T 7/80
    382/201
2016/0070981 A1* 3/2016 Sasaki ................. B60R 1/00
    348/148

FOREIGN PATENT DOCUMENTS

| CN | 103745498 | 4/2014 |
|---|---|---|
| CN | 103824278 | 5/2014 |
| CN | 105844696 | 8/2016 |

\* cited by examiner

METHOD AND DEVICE FOR IMAGE POSITIONING BASED ON 3D RECONSTRUCTION OF RAY MODEL

CROSS-REFERENCE TO RELATED APPLICATIONS

This application is a U.S. national phase application of International Application No. PCT/CN2016/113804, filed on Dec. 30, 2016, which claims a priority to Chinese Patent Application No. 201511026787.X, filed with the State Intellectual Property Office of P. R. China on Dec. 31, 2015, titled with "method and device for image positioning based on ray model three-dimensional reconstruction", and filed by TSINGHUA UNIVERSITY.

FIELD

The present disclosure relates to the technical field of image processing and pattern recognition, and more particularly, to a method and a device for image positioning based on 3D reconstruction of a ray model.

BACKGROUND

Image positioning technology is to calculate a pose based on one image or a group of images. This technology can be applied in robot navigation, route planning, digital tourism, virtual reality, etc., and can also be applied in areas where GPS (Global Positioning System) cannot work, such as indoor and underground. Compared with the positioning technology based on Bluetooth and WiFi (Wireless Fidelity), the image positioning technology does not rely on professional equipment and has low implementation cost.

In the related art, there are mainly two methods for image positioning. One method is based on image retrieval, which searches for an adjacent image of a query image in a database, and takes a position thereof as its own position. The other method is based on 3D reconstruction in combination with image-point cloud (2D-3D) matching. This method acquires a large number of plane images about a target scene in advance, performs 3D reconstruction offline to obtain a 3D feature point cloud of the scene, and in an online phase, extracts features of the query image and performs 2D-3D matching between the features of the query image and the 3D feature point cloud to estimate a pose of a target camera based on the matching result.

However, there are problems for the above methods. For the method based on image retrieval, since 3D information is not fully utilized, it can only be applied to cases where an attitude difference between the query image and library images is small, and positioning accuracy of this method is not better than positioning accuracy and sampling interval of the library image. Compared with the method based on image retrieval, the above-mentioned second method can obtain a more accurate positioning result, but its 3D reconstruction algorithm can only be applied in a plane camera, and limited to a small field of view of the plane camera, it usually needs to change multiple angles at the same position to obtain a large set of plane images for 3D reconstruction, and thus cost of reconstruction is high, such as quantity of acquisition is large and quantity of calculation is large.

SUMMARY

The present disclosure aims to solve at least one of the above technical problems to at least some extent.

Embodiments of a first aspect of the present disclosure provide a method for image positioning based on 3D reconstruction of a ray model. The method includes: acquiring a plurality of images of a plurality of scenes in advance, and performing feature extraction on the plurality of images respectively, to obtain a corresponding plurality of feature point sets; performing pairwise feature matching on the plurality of images, generating a corresponding eigen matrix according to the pairwise feature matching, and performing noise processing on the eigen matrix; performing 3D reconstruction according to the feature matching and the noise-processed eigen matrix and based on a ray model, to generate a 3D feature point cloud and a reconstructed camera pose set; acquiring a query image, and performing feature extraction on the query image to obtain a corresponding 2D feature point set; and performing image positioning according to the 2D feature point set, the 3D feature point cloud and the reconstructed camera pose set and based on a positioning attitude image optimization framework.

Embodiments of a second aspect of the present disclosure provide a device for image positioning based on 3D reconstruction of a ray model. The device includes: a first acquiring module, configured to acquire a plurality of images of a plurality of scenes in advance, and perform feature extraction on the plurality of images respectively, to obtain a corresponding plurality of feature point sets; a generating module, configured to perform pairwise feature matching on the plurality of images, generate a corresponding eigen matrix according to the pairwise feature matching, and perform noise processing on the eigen matrix; a reconstruction module, configured to perform 3D reconstruction according to the feature matching and the noise-processed eigen matrix and based on a ray model, to generate a 3D feature point cloud and a reconstructed camera pose set; a second acquiring module, configured to acquire a query image, and perform feature extraction on the query image to obtain a corresponding 2D feature point set; and an image positioning module, configured to perform image positioning according to the 2D feature point set, the 3D feature point cloud and the reconstructed camera pose set and based on a positioning attitude image optimization framework.

Embodiments of a third aspect of the present disclosure provide a storage medium, configured to store application program. The application program is configured to perform the method for image positioning based on 3D reconstruction of a ray model according to embodiments of the first aspect of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Reference will be made in detail to embodiments of the present disclosure. Embodiments of the present disclosure will be illustrated in drawings, in which the same or similar elements and the elements having same or similar functions are denoted by like reference numerals throughout the descriptions. The embodiments described below with reference to the accompanying drawings are exemplary and are intended to explain the present disclosure, but should not be construed to limit the present disclosure.

A method and a device for image positioning based on 3D reconstruction of a ray model according to embodiments of the present disclosure will be described below with reference to the accompanying drawings.

Figure 1:
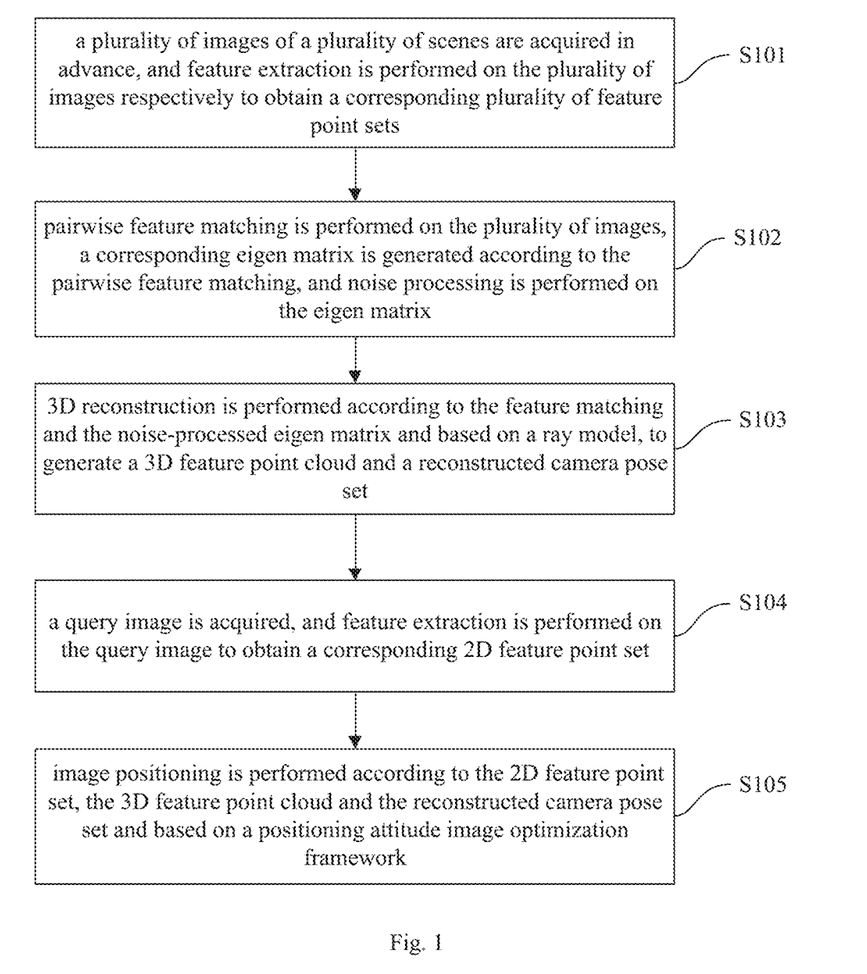
FIG. 1 is a flow chart of a method for image positioning based on 3D reconstruction of a ray model according to an embodiment of the present disclosure.

FIG. 1 is a flow chart of a method for image positioning based on 3D reconstruction of a ray model according to an embodiment of the present disclosure. As illustrated in FIG. 1, the method for image positioning based on 3D reconstruction of a ray model includes followings.

At block S101, a plurality of images of a plurality of scenes are acquired in advance, and feature extraction is performed on the plurality of images respectively to obtain a corresponding plurality of feature point sets.

In embodiments of the present disclosure, the term "a plurality of" should be understood in a broad sense, i.e., corresponding to a sufficient quantity. In addition, in embodiments of the present disclosure, the type of the image may include, but is not limited to, a panorama type, a fisheye type, a plane type, etc.

In detail, sufficient scene images can be acquired as images mentioned in the embodiment in advance, and SIFT (scale-invariant feature transform) features can be extracted respectively for these images, to obtain a position and a descriptor set of each feature point. The descriptor set is configured to describe surrounding area information of the corresponding feature point.

At block S102, pairwise feature matching is performed on the plurality of images, a corresponding eigen matrix is generated according to the pairwise feature matching, and noise processing is performed on the eigen matrix.

In detail, in embodiments of the present disclosure, pairwise matching may be performed on the plurality of images according to the plurality of feature point sets first, and feature point matching of each image pair may be stored. Then, the eigen matrix can be estimated based on matched feature point sets.

In more detail, the pairwise matching may be performed on all images according to the descriptor set of the feature point, and the feature point matching of each image pair may be stored. Then, the eigen matrix can be estimated based on the matched feature points, and the eigen matrix can be filtered at the same time. It can be understood that, in embodiments of the present disclosure, when the above-mentioned pairwise matching feature points are organized, a plurality of trajectories can be formed, in which, each trajectory corresponds to a 3D point to be reconstructed.

At block S103, 3D reconstruction is performed according to the feature matching and the noise-processed eigen matrix and based on a ray model, to generate a 3D feature point cloud and a reconstructed camera pose set.

It can be understood that, compared with pixel-based plane models in the related art, the present disclosure can be applied to various types of camera (such as a panoramic type, a fisheye type, a plane type, etc.) and unify them by using the ray model.

In detail, an attitude image may be constructed first. The attitude image may include camera nodes, 3D point nodes, camera-to-camera connection lines, camera-to-3D point connection lines, etc., which can together be used to describe a visibility relationship between the camera set and the 3D point set. Then, incremental reconstruction may be performed based on the ray model, i.e., a pair of cameras with higher relative attitude estimation quality may be selected as an initial seed, and new sample 3D points can be found by using triangulation based on the ray model, and then more cameras can be found based on the ray model and by using the new sample 3D points. Iteration and denoising are performed continuously until no more cameras or 3D points can be found.

Figure 2:
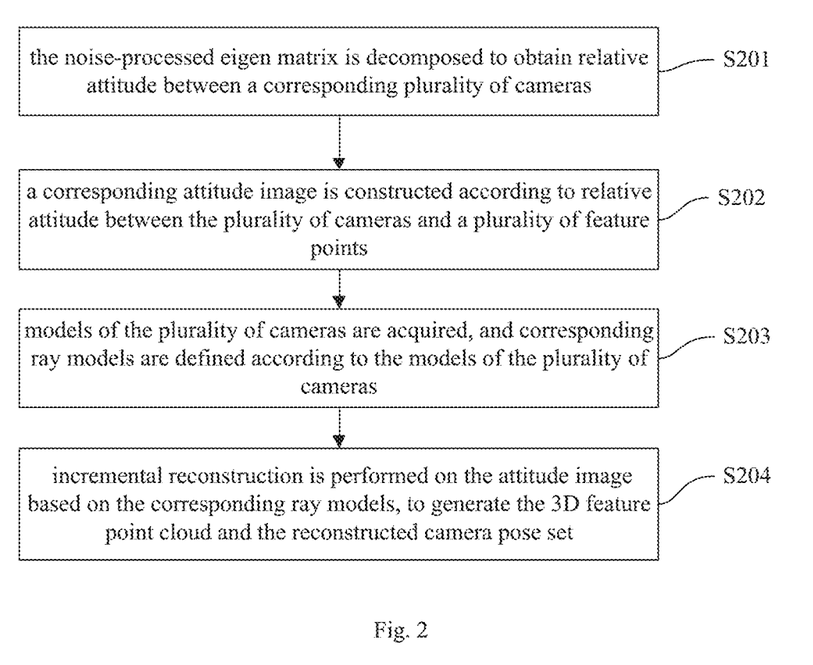
FIG. 2 is a flow chart of generating a 3D feature point cloud and a reconstructed camera pose set according to an embodiment of the present disclosure.

In detail, in embodiments of the present disclosure, as illustrated in FIG. 2, an implementation process of performing the 3D reconstruction according to the feature matching and the noise-processed eigen matrix and based on the ray model, to generate the 3D feature point cloud and the reconstructed camera pose set may include followings.

At block S201, the noise-processed eigen matrix is decomposed to obtain relative attitude between a corresponding plurality of cameras.

At block S202, a corresponding attitude image is constructed according to relative attitude between the plurality of cameras and a plurality of feature points.

In detail, the corresponding attitude image can be constructed according to the relative attitude between the plurality of cameras and the plurality of feature points through a preset attitude image construction formula. In embodiments of the present disclosure, the preset attitude image construction formula may be denoted as:

$$G=(NP,NX,EP,EX) \qquad (1)$$

where, NP is the camera node; NX is the feature point (i.e., the sample 3D point) node; EP is the camera-to-camera connection edge, which is attached with relative position and attitude attribute between a camera i and a camera k, in which the attribute can include relative rotation $R_{ik}$ and relative translation direction $C_{ik}$, i.e., $EP_{relpose}(i,k)=(R_{ik}, C_{ik})$; EX is the camera-to-feature point connection edge, which is attached with feature point coordinates $EX_{ox}=x_{ij}$ observed by the camera. Visibility functions $visX(X_j,P_s)$ and $visP(P_i,X_s)$ can be defined according to the attitude image, in which, $visX(X_j,P_s)=\{i:(i,j)\in EX, i\in P_s\}$ represents an observed camera set of $X_j$ in $P_s$ when the feature point $X_j$ and a camera set $P_s$ are given, $visP(P_i,X_s)=\{j:(i,j)\in EX, j\in X_s\}$ represents a feature point set observed by $P_i$ in $X_s$ when the feature point $X_j$ and a camera $P_s$ are given.

At block S203, models of the plurality of cameras are acquired, and corresponding ray models are defined according to the models of the plurality of cameras.

In detail, the models of the camera (such as a panoramic model, a fisheye model, a plane model, etc.) can be acquired first, and then the corresponding ray models can be defined according to the models of the camera. It should be noted that, the ray model may be defined based on a fact that each ray r can be defined by an origin point and another point x(x,y,z), $x^2+y^2+z^2=1$ on a unit ball. The ray is one-to-one corresponding to an image coordinate u(u,v) through a mapping function. The mapping function can be defined as x=k(u,K), u=k$^{-1}$(x,K), where K is internal parameters of the camera. For different camera models, their mapping functions may vary, in which, the mapping functions corresponding to a panoramic camera, a fisheye camera and a plane camera can be respectively described by following formulas (2) to (4):

$$p = \frac{u - u_c}{f}, t = \frac{v - v_c}{f}, u_c = (u_c, v_c) \qquad (2)$$
$$k(u, (f, u_c)) = (\cos(t)\sin(p), -\sin(t), \cos(t)\cos(p))$$
$$u_1 = \frac{u - u_c}{f}, v_1 = \frac{v - v_c}{f}, u_c = (u_c, v_c)$$
$$\phi = \arctan2(v_1, u_1)$$
$$r_1 = \sqrt{u_1^2 + v_1^{2(2)}} \qquad (3)$$
$$\theta = 2\arctan\left(\frac{r_1}{2}\right)$$
$$k(u, (f, u_c)) = (\cos(\phi)\sin(\theta), -\cos(\theta), \sin(\phi)\sin(\theta))$$
$$p = \arctan\left(\frac{u - u_c}{f}\right), t = \arctan\left(\frac{v - v_c}{f}\right) \qquad (4)$$
$$k(u, (f, u_c)) = (\cos(t)\sin(p), -\sin(t), \cos(t)\cos(p))$$

where in formulas (2) to (4), $u_c$ is a main point coordinate of the camera, f is a focal length, and especially for the panoramic camera, $$f = \frac{\text{image\_width}}{2\pi},$$

p is a rotation angle around y axis, t is a pitch angle around x axis, and $u_1$, $v_1$, $\phi$, $\theta$, r are temporary variables.

At block S204, incremental reconstruction is performed on the attitude image based on the corresponding ray models, to generate the 3D feature point cloud and the reconstructed camera pose set.

In detail, a pair of cameras with higher relative attitude estimation quality between multiple cameras can be selected as the initial seed, and the new 3D points can be found by using triangulation based on the ray model, and then more cameras can be found based on the ray model and by using the new sample 3D points. Iteration is performed continuously until no more cameras or 3D points can be found. In this process, nonlinear optimization can be continuously implemented to reduce an error of the 3D reconstruction, and moreover, a quality evaluation function can be used to eliminate the cameras and the 3D points with low qualities. It should be noted that, in this process, modules such as distance metrics, triangulation, camera attitude estimation, nonlinear optimization and the quality evaluation function are all improved with respect to the ray model, and it has a wider range of universality compared with reconstruction algorithms which can only be applied to plane images in the related art.

Thus, in the 3D reconstruction algorithm based on the ray model, by using the 3D rays to describe the 2D pixel coordinates, the ray models can represent various camera models (such as panoramas, fisheyes, planes, etc.) without distortion, i.e., can be applied to various types of cameras, thus scopes of application are expanded.

Furthermore, in an embodiment of the present disclosure, after the 3D feature point cloud and the reconstructed camera pose set are generated, the method may further include establishing an index tree of each 3D feature point cloud in the 3D feature point cloud, and establishing an index tree of spatial positions for the plurality of cameras in the reconstructed camera pose set. In detail, after the 3D reconstruction is completed, the index tree of the point cloud of features and the index tree of position of the camera can be established. It can be understood that, each point in the 3D feature point cloud is accompanied with several features, which come from images where the point is observed. In a subsequent online positioning phase, matching between the feature of the query image and the feature point cloud needs to be established to achieve the image positioning. In order to accelerate the matching process, in the present disclosure, a Kd-tree index tree is established for the feature point cloud to accelerate retrieval speed. In addition, since spatial neighbor of the query image needs to be retrieved in the online positioning phase, in the present disclosure, the Kd-tree index tree of spatial positions is also established for the reconstructed camera.

It should be noted that, in embodiments of the present disclosure, the above blocks S101-S103 may be offline analysis. In other words, through above blocks S101-S103, an image library can be established in advance, and according to the image library, the corresponding 3D feature point cloud and the reconstructed camera pose set are generated in advance and stored for use in the subsequent online image positioning phase.

At block S104, a query image is acquired, and feature extraction is performed on the query image to obtain a corresponding 2D feature point set.

In detail, the feature extraction may be performed on the acquired query image, to obtain the 2D feature point set of the query image. It should be noted that, each 2D feature point corresponds to a feature descriptor, each 3D point in the 3D feature point cloud corresponds to multiple feature descriptors, and these feature descriptors can be contributed by multiple images in the 3D reconstruction phase.

At block S105, image positioning is performed according to the 2D feature point set, the 3D feature point cloud and the reconstructed camera pose set and based on a positioning attitude image optimization framework.

In detail, matching (i.e., 2D-3D matching) between features of the query image and features of 3D point cloud generated in the offline phase can be performed, and an initial pose of the query image can be estimated using a camera attitude estimation algorithm based on a sufficient number of valid matching. Then, adjacent library cameras (i.e., adjacent images) can be found based on the initial pose, and the 2D-3D matching and relative attitude between the adjacent images can be fused to establish the positioning framework based on attitude image optimization, and to perform optimization to obtain a positioning result with high precision.

Figure 3:
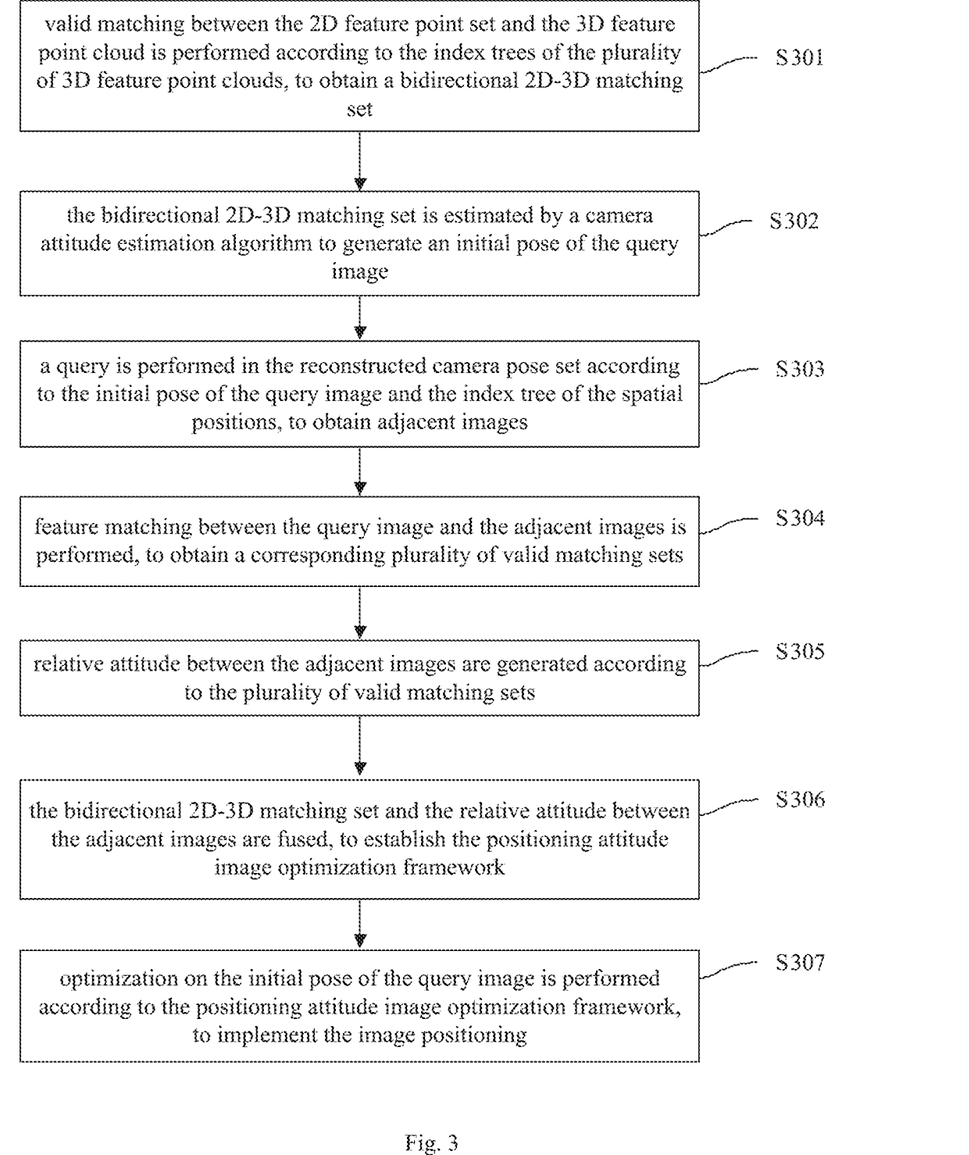
FIG. 3 is a flow chart of an implementation process of image positioning according to an embodiment of the present disclosure.

In detail, in an embodiment of the present disclosure, as illustrated in FIG. 3, an implantation process of performing image positioning according to the 2D feature point set, the 3D feature point cloud and the reconstructed camera pose set and based on the positioning attitude image optimization framework may include the followings.

At block S301, valid matching between the 2D feature point set and the 3D feature point cloud is performed according to the index trees of the plurality of 3D feature point clouds, to obtain a bidirectional 2D-3D matching set.

In detail, a k-neighbor query (such as k=5) can be performed on a 2D feature point $F_i^{2D}$ in a 3D point cloud feature set $F^{3D}$. When a ratio of a nearest neighbor to a secondary-nearest neighbor from different 3D points in the k-neighbor is less than a threshold $th_{match}$, it is considered that a valid unidirectional matching from 2D to 3D is constructed between the 2D feature point and the nearest neighboring 3D point, and all such matching in $F^{2D}$ establish an unidirectional valid matching set $M^{2D \to 3D}(F^{2D}, F^{3D})$ from 2D to 3D. For each 3D point in $M^{2D \to 3D}(F^{2D}, F^{3D})$, a nearest neighbor and a secondary-nearest neighbor are queried reversely in the feature set $F^{2D}$ of the query image. When a ratio between the nearest neighbor to the secondary-nearest neighbor is less than a threshold $th_{match}$, it is considered that a valid unidirectional matching from 3D to 2D is obtained, and these matching establish a unidirectional matching set $M^{2D \leftarrow 3D}(F^{2D}, F^{3D})$ from 3D to 2D. An intersection of these two unidirectional matching sets $M^{2D \to 3D}(F^{2D}, F^{3D})$ and $M^{2D \leftarrow 3D}(F^{2D}, F^{3D})$ is a bidirectional 2D-3D matching set $M^{2D\text{-}3D}(F^{2D}, F^{3D})$.

At block S302, the bidirectional 2D-3D matching set is estimated by a camera attitude estimation algorithm to generate an initial pose of the query image.

In detail, based on the bidirectional 2D-3D matching set $M^{2D\text{-}3D}(F^{2D}, F^{3D})$ the 2D-3D matching that does not meet camera geometry constraint is eliminated by the camera attitude estimation algorithm, to obtain an interior point set $I^{2D\text{-}3D}$, and the initial pose $P_q^{2D\text{-}3D} = R_q^{2D\text{-}3D}[I|-C_q^{2D\text{-}3D}]$ of the query image is estimated, where $P_q^{2D\text{-}3D}$ is a camera matrix of a query camera, which consists of a rotation matrix R and an optical center position C of the camera matrix.

At block S303, a query is performed in the reconstructed camera pose set according to the initial pose of the query image and the index tree of the spatial positions, to obtain adjacent images.

In detail, an initial spatial position $C_q^{2D\text{-}3D}$ of a query image q may be obtained from the initial pose of the query image first, and then the query can be performed in the reconstructed camera pose set corresponding to the 3D feature point cloud based on the initial spatial position of the query image and the index tree of the spatial positions to obtain the k-neighbor $\{P_i, i=1, \ldots, k\}$, (i.e., the adjacent images).

At block S304, feature matching between the query image and the adjacent images is performed, to obtain a corresponding plurality of valid matching sets.

In detail, the 2D-2D feature matching between the query image and the adjacent images can be performed to obtain multiple valid matching sets between the two images.

At block S305, relative attitude between the adjacent images are generated according to the plurality of valid matching sets.

In detail, the eigen matrix may be estimated based on the valid matching set, and inner point matching can be obtained at the same time. When the number of matching is less than a threshold, it is considered that noise of the eigen matrix is large, the adjacent images are removed, and the eigen matrix is decomposed to obtain the relative attitude $R_{iq}, C_{iq}$ between the adjacent images. The translation $C_{iq}$ in the relative attitude can only provide direction and cannot provide size.

At block S306, the bidirectional 2D-3D matching set and the relative attitude between the adjacent images are fused, to establish the positioning attitude image optimization framework.

In detail, the attitude image $G_q = (NP, NX, EP, EX)$ of the query image q can be defined, where NP is the camera node, which includes a camera $P_q$ of the query image and cameras $\{P_i, i=1, \ldots, k\}$ of the adjacent images; NX is 3D point node, corresponding to the 3D points obtained in the 2D-3D matching; EP is connection edges between the camera $P_q$ of the query image and the cameras $\{P_i, i=1, \ldots, k\}$ of the adjacent images, which is attached with the relative position and attitude between i and q, and includes relative rotation $R_{iq}$ and relative translation direction $C_{iq}$, i.e., $EP_{rel\text{-}pose}(i,q) = (R_{iq}, C_{iq})$; EX is the connection edge between the camera $P_q$ of the query image and 3D point $X_j$, which is attached with feature point coordinates $EX_{ox} = x_{qj}$ observed by the camera $P_q$ of the query image.

Then, the sum of a back-projection error and a relative attitude error is optimized, and a target function (i.e., the above-mentioned positioning attitude image optimization framework) is constructed based on the query image as follows:

$$\min f(P_q) = \min \frac{1}{n} \sum_{j=1,\ldots,n} d_x(P_q, X_j; x_{qj}) + \frac{\lambda}{m} d_{rel}(P_i, P_q; R_{iq}, C_{iq}) \qquad (5)$$

where $P_q = R_q[I|-C_q]$ is the camera matrix of the query image to be optimized, $R_q, C_q$ are rotation and translation of the camera in a world coordinate system, $\{(x_{qj}, X_j), j=1, \ldots n\}$ is an inputted bidirectional 2D-3D matching set, $\{(P_i, R_{iq}, C_{iq}), i=1, \ldots m\}$ is a set of adjacent images of the query image and corresponding relative attitudes, $\lambda$ is a balance factor of two types of cost; $d_{rel}(\ )$ is a cost function on a relative attitude edge and is defined as follows:

$$d_{rel}(P_i, P_q; R_{iq}, C_{iq}) = d_R(R_i R_{iq}, R_q) + \left\| \frac{C_q - C_i}{\|C_q - C_i\|} - R_i C_{iq} \right\|, \qquad (6)$$

where, the cost function of the relative attitude includes two terms, which are cost of rotation and cost of translation direction, which are independent from each other. The cost of the rotation is defined as a relative Euler angle of $R_i, R_q$, $$d_R(R_i, R_q) = \arccos\left(\frac{\text{trace}(R_i R_q^T) - 1}{2}\right).$$

The cost of the translation direction is a chord distance between observed translation direction $R_i C_{iq}$ and a translation direction $$\frac{C_q - C_i}{\|C_q - C_i\|}$$

to be optimized.

At block S307, optimization on the initial pose of the query image is performed according to the positioning attitude image optimization framework, to implement the image positioning.

In detail, by taking a positioning result $P_q^{2D\text{-}3D}$ (i.e., the above initial pose of the query image) of the 2D-3D as an initial value, optimization is performed on the initial pose $P_q^{2D\text{-}3D}$ of the query image by a Levenberg-Marquardt algorithm according to the positioning attitude image optimization framework, to obtain the positioning result with high precision.

Thus, compared with positioning methods which only use 2D-3D matching information in the related art, the present disclosure fuses the 2D-3D matching information and relative attitude information between images by using a method for optimizing images, thus improving accuracy of a final positioning result.

It should be noted that, the above-mentioned blocks S104-S105 are online calculation, i.e., the query image is received, and then the pre-generated 3D feature point cloud and the reconstructed camera pose set are queried according to the query image, so as to implement the image positioning.

In the following, the method for image positioning based on 3D reconstruction of a ray model according to embodiments of the present disclosure will be described below with reference to FIG. 4.

Figure 4:
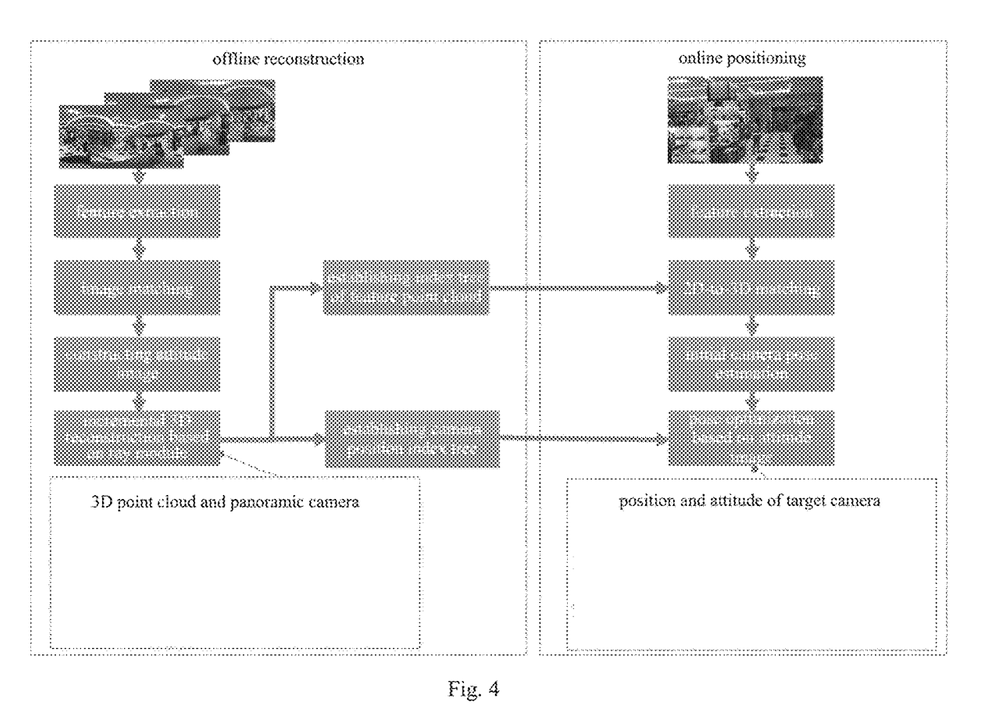
FIG. 4 is a schematic diagram of a method for image positioning based on 3D reconstruction of a ray model according to an embodiment of the present disclosure.

For example, as illustrated in FIG. 4, the offline reconstruction can be performed in advance, to obtain the 3D feature point cloud and the reconstructed camera pose set. In other words, sufficient scene images can be acquired offline first, features of the images can be extracted and pairwise matching can be performed on the images. Then, the attitude image can be constructed, and the incremental 3D reconstruction can be performed based on the ray model to obtain the 3D feature point cloud and the reconstructed camera pose set, and the index tree of the 3D feature point cloud and the index tree of the spatial positions of the camera can be established. When the query image is acquired, the online positioning can be performed. In other words, feature extraction may be performed on the acquired query images first, the valid 2D-3D matching between the extracted features and the 3D feature point cloud can be performed to obtain the bidirectional 2D-3D matching set, and then the bidirectional 2D-3D matching set can be estimated by the camera attitude estimation algorithm to generate the initial pose of the query image, and adjacent cameras can be retrieved and the relative attitude can be calculated. Finally, the positioning result (i.e., position and attitude of the target camera) with high precision can be obtained by establishing the positioning attitude image fusing the information.

With the method for image positioning based on 3D reconstruction of a ray model according to embodiments of the present disclosure, in the process of 3D reconstruction based on the ray model, 2D pixel coordinates are described by using 3D rays. The ray model can represent multiple camera models (such as panorama cameras, fisheye cameras, and plane cameras) without distortion, i.e., can be applied to various types of cameras, and make full use of inherent geometric properties of the cameras, such that the reconstruction effect is better, the acquisition cost is reduced, and the calculation speed is improved. Moreover, in the process of image positioning, proposed positioning framework based on optimization of attitude image fuses the 2D-3D feature matching between image point clouds and pose information of adjacent cameras, accuracy of image positioning is improved.

In order to implement the above embodiments, the present disclosure also provides a device for image positioning based on 3D reconstruction of a ray model.

Figure 5:
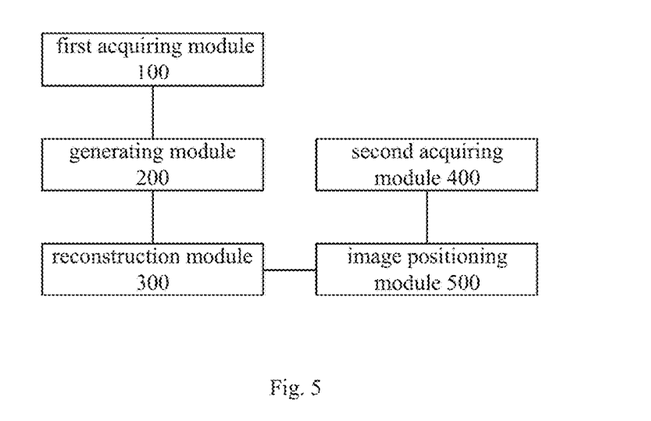
FIG. 5 is a block diagram of a device for image positioning based on 3D reconstruction of a ray model according to an embodiment of the present disclosure.

FIG. 5 is a block diagram of a device for image positioning based on 3D reconstruction of a ray model according to an embodiment of the present disclosure. As illustrated in FIG. 5, the device for image positioning based on 3D reconstruction of a ray model may include a first acquiring module 100, a generating module 200, a reconstruction module 300, a second acquiring module 400 and an image positioning module 500.

In detail, the first acquiring module 100 is configured to acquire a plurality of images of a plurality of scenes in advance, and perform feature extraction on the plurality of images respectively to obtain a corresponding plurality of feature point sets. In embodiments of the present disclosure, the term "a plurality of" should be understood in a broad sense, i.e., corresponding to a sufficient quantity. In addition, in embodiments of the present disclosure, the type of the image may include, but is not limited to, a panorama type, f a fisheye type, a plane type, etc.

In more detail, the first acquiring module 100 may acquire sufficient scene images as images mentioned in the embodiment in advance, and extract SIFT features for these images respectively, to obtain a position and a descriptor set of each feature point, in which the descriptor set is configured to describe information of a surrounding area of a corresponding feature point.

The generating module 200 is configured to perform pairwise feature matching on the plurality of images, and generate a corresponding eigen matrix according to the pairwise feature matching, and perform noise processing on the eigen matrix. In detail, in embodiments of the present disclosure, the generating module 200 may perform pairwise matching on the plurality of images according to the plurality of feature point sets first, and store feature point matching of each image pair, and then estimate the eigen matrix based on matched feature point sets.

In more detail, the generating module 200 may perform the pairwise matching on all images according to the descriptor set of the feature point, and store the feature point matching of each image pair, and then estimate the eigen matrix based on the matched feature points, and filter the eigen matrix at the same time. It can be understood that, in the embodiment of the present disclosure, when the above-mentioned pairwise matching feature points are organized, a plurality of trajectories can be formed, in which each trajectory corresponds to a 3D point to be reconstructed.

The reconstruction module 300 is configured to perform 3D reconstruction according to the feature matching and the noise-processed eigen matrix and based on a ray model to generate a 3D feature point cloud and a reconstructed camera pose set. It can be understood that, compared with pixel-based plane models in the related art, the ray model in the present disclosure can adapt to various types of camera (such as a panoramic type, a fisheye type, a plane type, etc.) and unify them.

In more detail, the reconstruction module 300 may construct the attitude image first. The attitude image may include camera nodes, 3D point nodes, camera-to-camera connection lines, camera-to-3D point connection lines, etc., which can together be used to describe a visibility relationship between the camera set and the 3D point set. Then, incremental reconstruction may be performed based on the ray model, i.e., a pair of cameras with higher relative attitude estimation quality may be selected as an initial seed, and new 3D points can be found by using triangulation based on the ray model, and then more cameras can be found based on the ray model and by using the new 3D points. Iteration and denoising are performed continuously until no more cameras or 3D points can be found.

Figure 6:
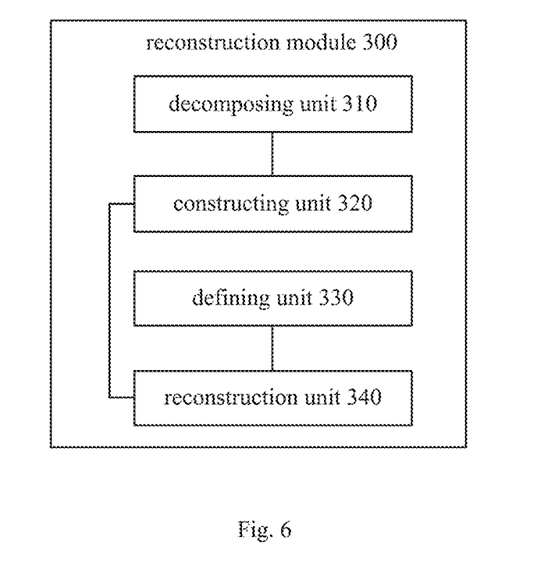
FIG. 6 is a block diagram of a reconstruction module according to an embodiment of the present disclosure.

In detail, in embodiments of the present disclosure, as illustrated in FIG. 6, the reconstruction module 300 may include a decomposing unit 310, a construction unit 320, a definition unit 330 and a reconstruction unit 340. In detail, the decomposing unit 310 is configured to decompose the noise-processed eigen matrix to obtain relative attitude between a corresponding plurality of cameras.

The construction unit 320 is configured to construct a corresponding attitude image according to the relative attitude between the plurality of cameras and a plurality of feature points. In more detail, the corresponding attitude image can be constructed according to the relative attitude between the plurality of cameras and the plurality of feature points through a preset attitude image construction formula. In embodiments of the present disclosure, the preset attitude image construction formula may be denoted as the above formula (1).

The definition unit 330 is configured to acquire models of the plurality of cameras, and define corresponding ray models according to the models of the plurality of cameras. In detail, the definition unit 330 can obtain the model of the camera (such as a panoramic model, a fisheye model, a plane model, etc.) first, and then define the corresponding ray model according to the model of the camera. It should be noted that, the ray model may be defined based on a fact that each ray r can be defined by an origin point and another point $x(x,y,z)$, $x^2+y^2+z^2=1$ on a unit ball. The ray is one-to-one corresponding to an image coordinate $u(u,v)$ through a mapping function. The mapping function can be defined as $x=k(u,K), u=k^{-1}(x,K)$, where K is an internal parameter of the camera. For different camera models, their mapping functions may vary, in which, the mapping functions corresponding to a panoramic camera, a fisheye camera and a plane camera can be respectively described by the above formulas (2) to (4).

The reconstruction unit 340 is configured to perform incremental reconstruction on the attitude image based on the corresponding ray models, to generate the 3D feature point cloud and the reconstructed camera pose set. In more detail, the reconstruction unit 340 can select a pair of cameras with higher relative attitude estimation quality between multiple cameras can be selected as the initial seed, and then found new 3D points by using triangulation based on the ray model, and then found more cameras can be found based on the ray model and by using the new sample 3D points. Iteration is performed continuously until no more cameras or 3D points can be found. In this process, nonlinear optimization can be continuously implemented to reduce an error of the 3D reconstruction, and moreover, a quality evaluation function can be used to eliminate the cameras and the 3D points with low qualities. It should be noted that, in this process, modules such as distance metrics, triangulation, camera attitude estimation, nonlinear optimization and the quality evaluation function are all improved with respect to the ray model, and it has a wider range of universality compared with reconstruction algorithms which can only be applied to plane images in the related art.

Thus, in the 3D reconstruction algorithm based on the ray model, by using the 3D rays to describe the 2D pixel coordinates, the ray model can represent multiple camera models (such as panoramas, fisheyes, planes, etc.) without distortion, i.e., can be applied to various types of cameras, thus scopes of application are expanded.

Figure 7:
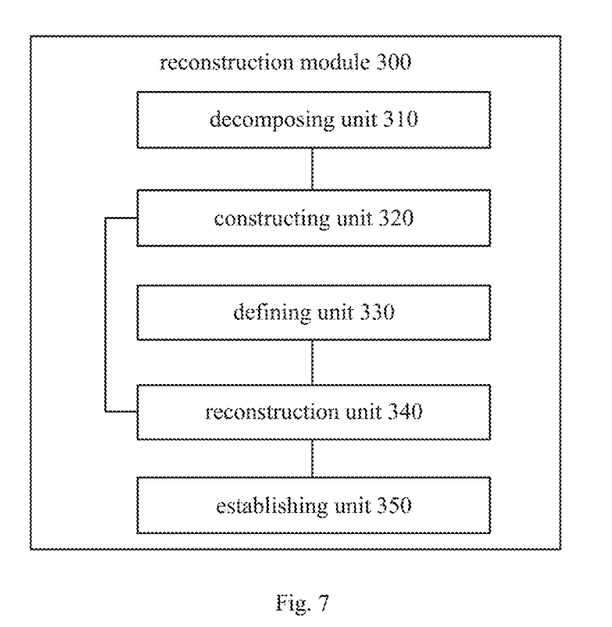
FIG. 7 is a block diagram of a reconstruction module according to another embodiment of the present disclosure.

Furthermore, in an embodiment of the present disclosure, as illustrated in FIG. 7, the reconstruction module 300 further includes an establishing unit 350. The establishing unit 350 is configured to establish an index tree of each 3D feature point cloud in the 3D feature point cloud and an index tree of spatial positions for the plurality of cameras in the reconstructed camera pose set after the reconstruction unit 340 generates the 3D feature point cloud and the reconstructed camera pose set. In detail, after the reconstruction unit 340 completes the 3D reconstruction, the establishing unit 350 can establish the index tree of the feature point cloud and the index tree of position of the camera. It can be understood that, each point in the 3D feature point cloud is accompanied with several features, which come from images where the point is observed. In a subsequent online positioning phase, matching between the feature of the query image and the feature point cloud needs to be established to achieve the image positioning. In order to accelerate the matching process, in the present disclosure, a Kd-tree index tree is established for the feature point cloud to accelerate retrieval speed. In addition, since spatial neighbor of the query image needs to be retrieved in the online positioning phase, in the present disclosure, the Kd-tree index tree of spatial positions is also established for the reconstructed camera.

The second acquiring module 400 is configured to acquire a query image, and perform feature extraction on the query image to obtain a corresponding 2D feature point set. In more detail, the second acquiring module 400 can perform feature extraction on the acquired query image to obtain the 2D feature point set of the query image. It should be noted that, each 2D feature point corresponds to a feature descriptor, each 3D point in the 3D feature point cloud corresponds to multiple feature descriptors, and these feature descriptors can be contributed by multiple images in the 3D reconstruction phase.

The image positioning module 500 is configured to perform image positioning according to the 2D feature point set, the 3D feature point cloud and the reconstructed camera pose set and based on a positioning attitude image optimization framework. In more detail, the image positioning module 500 can perform matching (i.e., 2D-3D matching) between features of the query image and features of 3D point cloud generated in the offline phase, and estimate an initial pose of the query image using a camera attitude estimation algorithm based on a sufficient number of valid matching. Then, the image positioning module 500 can found an adjacent library cameras (i.e., adjacent images) based on the initial pose, and fuse the 2D-3D matching and relative attitude between the adjacent images to establish the positioning framework based on attitude image optimization, and to perform optimization to obtain a positioning result with high precision.

Figure 8:
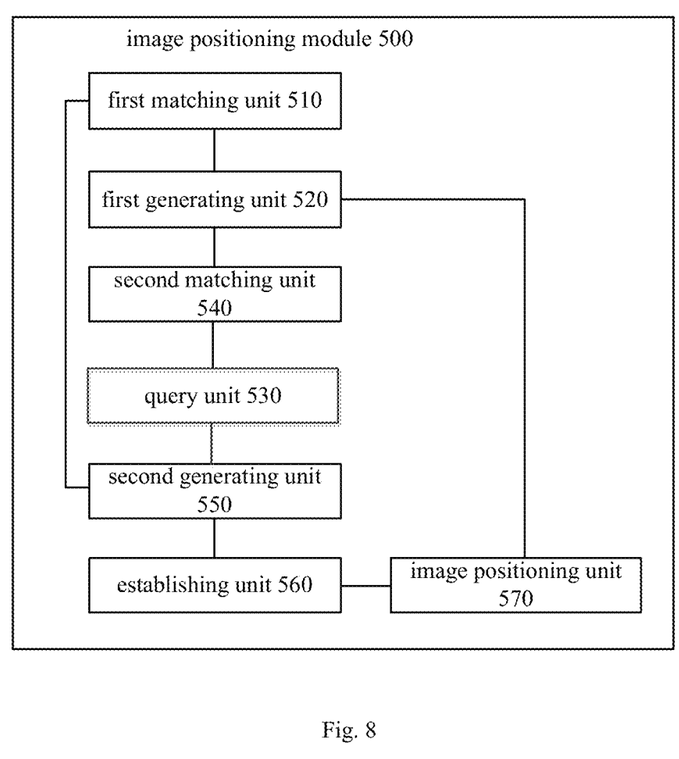
FIG. 8 is a block diagram of an image positioning module according to an embodiment of the present disclosure.

In detail, in embodiments of the present disclosures, as illustrated in FIG. 8, the image positioning module 500 may include a first matching unit 510, a first generating unit 520, a query unit 530, a second matching unit 540, a second generating unit 550, an establishing unit 560 and an image positioning unit 570.

In detail, the first matching unit 510 is configured to perform valid matching between the 2D feature point set and the 3D feature point cloud according to the index trees of the plurality of 3D feature point clouds, to obtain a bidirectional 2D-3D matching set.

In more detail, the first matching unit 510 may perform a k-neighbor query (such as k=5) on a 2D feature point $F_i^{2D}$ in a 3D point cloud feature set $F^{3D}$. When a ratio of a nearest neighbor to a secondary-nearest neighbor from different 3D points in the k-neighbor is less than a threshold $th_{match}$, it is considered that a valid unidirectional matching from 2D to 3D is constructed between the 2D feature point and the nearest neighboring 3D point, and all such matching in $F^{2D}$ establish an unidirectional valid matching set $M^{2D\rightarrow 3D}(F^{2D}, F^{3D})$ from 2D to 3D. For each 3D point in $M^{2D\rightarrow 3D}(F^{2D}, F^{3D})$, a nearest neighbor and a secondary-nearest neighbor are queried reversely in the feature set $F^{2D}$ of the query image. When a ratio between the nearest neighbor to the secondary-nearest neighbor is less than a threshold $th_{match}$, it is considered that a valid unidirectional matching from 3D to 2D is obtained, and these matching establish a unidirectional matching set $M^{2D \leftarrow 3D}(F^{2D}, F^{3D})$ from 3D to 2D. An intersection of these two unidirectional matching sets $M^{2D \rightarrow 3D}(F^{2D}, F^{3D})$ and $M^{2D \leftarrow 3D}(F^{2D}, F^{3D})$ is a bidirectional 2D-3D matching set $M^{2D-3D}(F^{2D}, F^{3D})$.

The first generating unit 520 is configured to estimate the bidirectional 2D-3D matching set by a camera attitude estimation algorithm to generate an initial pose of the query image. In more detail, based on the bidirectional 2D-3D matching set $M^{2D-3D}(F^{2D}, F^{3D})$ the first generating unit 520 may eliminate the 2D-3D matching that does not meet camera geometry constraint by the camera attitude estimation algorithm to obtain an interior point set $I^{2D-3D}$ and estimate the initial pose $P_q^{2D-3D} = R_q^{2D-3D}[I|-C_q^{2D-3D}]$ of the query image, where $P_q^{2D-3D}$ is a camera matrix of a query camera, which consists of a rotation matrix R and an optical center position C of the camera matrix.

The query unit 530 is configured to perform a query in the reconstructed camera pose set according to the initial pose of the query image and the index tree of the spatial positions, to obtain adjacent images. In more detail, the query unit 530 may obtain an initial spatial position $C_q^{2D-3D}$ of a query image q from the initial pose of the query image first, and then perform the query in the reconstructed camera pose set corresponding to the 3D feature point cloud based on the initial spatial position of the query image and the index tree of the spatial positions to obtain the k-neighbor $\{P_i, i=1, \ldots, k\}$, (i.e., the adjacent images).

The second matching unit 540 is configured to perform feature matching between the query image and the adjacent images, to obtain a corresponding plurality of valid matching sets. In more detail, the second matching unit 540 may perform 2D-2D feature matching between the query image and the adjacent images to obtain multiple valid matching sets between the two images.

The second generating unit 550 is configured to generate relative attitude between the adjacent images according to the plurality of valid matching sets. In more detail, the second generating unit 550 may estimate eigen matrix based on the valid matching set, and obtain inner point matching at the same time. When the number of matching is less than a threshold, it is considered that noise of the eigen matrix is large, the adjacent images are removed, and the eigen matrix is decomposed to obtain the relative attitude $R_{iq}, C_{iq}$ between the adjacent images. The translation $C_{iq}$ in the relative attitude can only provide direction and cannot provide size.

The establishing unit 560 is configured to fuse the bidirectional 2D-3D matching set and the relative attitude between the adjacent images, to establish the positioning attitude image optimization framework. In more detail, the establishing unit 560 may define the attitude image $G_q$=(NP, NX,EP,EX) of the query image q, where NP is the camera node, which includes a camera $P_q$ of the query image and cameras $\{P_i, i=1, \ldots, k\}$ of adjacent images; NX is 3D point node, corresponding to the 3D points obtained in the 2D-3D matching; EP is the connection edge between the camera $P_q$ of the query image and the cameras $\{P_i, i=1, \ldots, k\}$ of the adjacent images, which is attached with the relative position and attitude between i and q, and includes relative rotation $R_{iq}$ and relative translation direction $C_{iq}$, i.e., $EP_{rel-pose}(i,q)=(R_{iq},C_{iq})$; EX is connection edge between the camera $P_q$ of the query image and 3D point $X_j$, which is attached with feature point coordinates $EX_{ox}=x_{qj}$ observed by the camera $P_q$ of the query image. Then, the sum of a back-projection error and a relative attitude error is optimized, and a target function (i.e., the above-mentioned positioning attitude image optimization framework) can be constructed based on the query image as in the above formula (5).

The image positioning unit 570 is configured to perform optimization on the initial pose of the query image according to the positioning attitude image optimization framework, to implement image positioning. In more detail, by taking a positioning result $p_q^{2D-3D}$ (i.e., the above initial pose of the query image) of the 2D-3D as an initial value, the image positioning unit 570 can perform optimization on the initial pose $p_q^{2D-3D}$ of the query image by a Levenberg-Marquardt algorithm according to the positioning attitude image optimization framework, to obtain the positioning result with high precision.

Thus, compared with positioning methods which only use 2D-3D matching information in the related art, the present disclosure fuses the 2D-3D matching information and relative attitude information between images by using a method for optimizing images, thus improving accuracy of a final positioning result.

With the device for image positioning based on 3D reconstruction of a ray model according to embodiments of the present disclosure, in the process of 3D reconstruction based on the ray model, 2D pixel coordinates are described by using 3D rays. The ray model can represent multiple camera models (such as panorama cameras, fisheye cameras, and plane cameras) without distortion, i.e., can be applied to various types of cameras, and make full use of inherent geometric properties of the cameras, such that the reconstruction effect is better, the acquisition cost is reduced, and the calculation speed is improved. Moreover, in the process of image positioning, proposed positioning framework based on optimization of attitude image fuses the 2D-3D feature matching between image point clouds and pose information of adjacent cameras, accuracy of image positioning is improved.

In order to implement the above embodiments, the present disclosure also provides a storage medium, configured to store application program. The application program is configured to perform the method for image positioning based on 3D reconstruction of a ray model according to any one of the above embodiments of the present disclosure.

In descriptions of the present disclosure, it should be understood that, terms such as "first" and "second" are used herein for purposes of description and are not intended to indicate or imply relative importance or significance. Thus, the feature defined with "first" and "second" may comprise one or more this feature. In descriptions of the present disclosure, unless specified otherwise, "a plurality of" means at least two, for example, two or three.

In descriptions of the present disclosure, terms such as "an embodiment," "some embodiments," "an example," "a specific example," or "some examples," means that a particular feature, structure, material, or characteristic described in connection with the embodiment or example is included in at least one embodiment or example of the present disclosure. In the present specification, the appearances of the above terms are not necessarily referring to the same embodiment or example of the present disclosure. Furthermore, the particular features, structures, materials, or characteristics may be combined in any suitable manner in one or more embodiments or examples. In addition, under non-contradictory circumstances, various embodiments or examples as well as features of various embodiments or examples described in the present specification can be combined by those skilled in the art.

Although explanatory embodiments have been illustrated and described, it would be appreciated by those skilled in the art that the above embodiments cannot be construed to limit the present disclosure, and changes, alternatives, and modifications may be made in the embodiments without departing from spirit, principles and scope of the present disclosure.

What is claimed is:

1. A method for image positioning based on 3D reconstruction of a ray model, comprising:
   acquiring a plurality of images of a plurality of scenes in advance, and performing feature extraction on the plurality of images respectively, to obtain a corresponding plurality of feature point sets;
   performing pairwise feature matching on the plurality of images, generating a corresponding eigen matrix according to the pairwise feature matching, and performing noise processing on the eigen matrix;
   performing 3D reconstruction according to the feature matching and the noise-processed eigen matrix and based on a ray model, to generate a 3D feature point cloud and a reconstructed camera pose set;
   acquiring a query image, and performing feature extraction on the query image to obtain a corresponding 2D feature point set; and
   performing image positioning according to the 2D feature point set, the 3D feature point cloud and the reconstructed camera pose set and based on a positioning attitude image optimization framework.

2. The method for image positioning based on 3D reconstruction of a ray model according to claim 1, wherein performing the pairwise feature matching on the plurality of images, and generating the corresponding eigen matrix according to the pairwise feature matching comprises:
   performing pairwise matching on the plurality of images according to the plurality of feature point sets, and storing feature point matching of each image pair; and
   estimating the eigen matrix based on matched feature point sets.

3. The method for image positioning based on 3D reconstruction of a ray model according to claim 1, wherein performing the 3D reconstruction according to the feature matching and the noise-processed eigen matrix and based on the ray model, to generate the 3D feature point cloud and the reconstructed camera pose set comprises:
   decomposing the noise-processed eigen matrix, to obtain relative attitude between a corresponding plurality of cameras;
   constructing a corresponding attitude image according to the relative attitude between the plurality of cameras and a plurality of feature points;
   acquiring models of the plurality of cameras, and defining corresponding ray models according to the models of the plurality of cameras;
   performing incremental reconstruction on the attitude image based on the corresponding ray models, to generate the 3D feature point cloud and the reconstructed camera pose set.

4. The method for image positioning based on 3D reconstruction of a ray model according to claim 3, after generating the 3D feature point cloud and the reconstructed camera pose set, further comprising:
   establishing an index tree of each 3D feature point cloud in the 3D feature point cloud, and establishing an index tree of spatial positions for the plurality of cameras in the reconstructed camera pose set.

5. The method for image positioning based on 3D reconstruction of a ray model according to claim 4, wherein performing the 3D reconstruction according to the feature matching and the noise-processed eigen matrix and based on the ray model, to generate the 3D feature point cloud and the reconstructed camera pose set comprises:
   performing valid matching between the 2D feature point set and the 3D feature point cloud according to the index trees of the plurality of 3D feature point clouds, to obtain a bidirectional 2D-3D matching set;
   estimating the bidirectional 2D-3D matching set by a camera attitude estimation algorithm to generate an initial pose of the query image;
   performing a query in the reconstructed camera pose set according to the initial pose of the query image and the index tree of the spatial positions, to obtain adjacent images;
   performing feature matching between the query image and the adjacent images, to obtain a corresponding plurality of valid matching sets;
   generating relative attitude between the adjacent images according to the plurality of valid matching sets;
   fusing the bidirectional 2D-3D matching set and the relative attitude between the adjacent images, to establish the positioning attitude image optimization framework; and
   performing optimization on the initial pose of the query image according to the positioning attitude image optimization framework, to implement the image positioning.

6. A device for image positioning based on 3D reconstruction of a ray model, comprising:
   a processor; and
   a memory, configured to store one or more software modules executable by the processor;
   wherein the one or more software modules comprise:
      a first acquiring module, configured to acquire a plurality of images of a plurality of scenes in advance, and perform feature extraction on the plurality of images respectively, to obtain a corresponding plurality of feature point sets;
      a generating module, configured to perform pairwise feature matching on the plurality of images, generate a corresponding eigen matrix according to the pairwise feature matching, and perform noise processing on the eigen matrix;
      a reconstruction module, configured to perform 3D reconstruction according to the feature matching and the noise-processed eigen matrix and based on a ray model, to generate a 3D feature point cloud and a reconstructed camera pose set;
      a second acquiring module, configured to acquire a query image, and perform feature extraction on the query image to obtain a corresponding 2D feature point set; and
      an image positioning module, configured to perform image positioning according to the 2D feature point set, the 3D feature point cloud and the reconstructed camera pose set and based on a positioning attitude image optimization framework.

7. The device for image positioning based on 3D reconstruction of a ray model according to claim 6, wherein the generating module is configured to:
   perform the pairwise matching on the plurality of images according to the plurality of feature point sets, and store feature point matching of each image pair; and
   estimate the eigen matrix based on matched feature point sets.

8. The device for image positioning based on 3D reconstruction of a ray model according to claim 6, wherein the reconstruction module comprises:
  a decomposing unit, configured to decompose the noise-processed eigen matrix to obtain relative attitude between a corresponding plurality of cameras;
  a construction unit, configured to construct a corresponding attitude image according to the relative attitude between the plurality of cameras and a plurality of feature points;
  a definition unit, configured to acquire models of the plurality of cameras, and define corresponding ray models according to the models of the plurality of cameras;
  a reconstruction unit, configured to perform incremental reconstruction on the attitude image based on the corresponding ray models, to generate the 3D feature point cloud and the reconstructed camera pose set.

9. The device for image positioning based on 3D reconstruction of a ray model according to claim 8, wherein the one or more software modules further comprise:
  an establishing module configured to establish an index tree of each 3D feature point cloud in the 3D feature point cloud and establish an index trees of spatial positions for the plurality of cameras in the reconstructed camera pose set after the reconstruction unit generates the 3D feature point cloud and the reconstructed camera pose set.

10. The device for image positioning based on 3D reconstruction of a ray model according to claim 9, wherein the image positioning module comprises:
  a first matching unit, configured to perform valid matching between the 2D feature point set and the 3D feature point cloud according to the index trees of the multiple 3D feature point clouds, to obtain a bidirectional 2D-3D matching set;
  a first generating unit, configured to estimate the bidirectional 2D-3D matching set by a camera attitude estimation algorithm to generate an initial pose of the query image;
  a query unit, configured to perform a query in the reconstructed camera pose set according to the initial pose of the query image and the index tree of the spatial positions, to obtain adjacent images;
  a second matching unit, configured to perform feature matching between the query image and the adjacent images, to obtain a corresponding plurality of valid matching sets;
  a second generating unit, configured to generate relative attitude between the adjacent images according to the plurality of valid matching sets;
  an establishing unit, configured to fuse the bidirectional 2D-3D matching set and the relative attitude between the adjacent images, to establish the positioning attitude image optimization framework; and
  an image positioning unit, configured to perform optimization on the initial pose of the query image according to the positioning attitude image optimization framework, to implement image positioning.

11. A non-transitory storage medium, configured to store application program, wherein the application program is configured to perform a method for image positioning based on 3D reconstruction of a ray model, the method comprising:
  acquiring a plurality of images of a plurality of scenes in advance, and performing feature extraction on the plurality of images respectively, to obtain a corresponding plurality of feature point sets;
  performing pairwise feature matching on the plurality of images, generating a corresponding eigen matrix according to the pairwise feature matching, and performing noise processing on the eigen matrix;
  performing 3D reconstruction according to the feature matching and the noise-processed eigen matrix and based on a ray model, to generate a 3D feature point cloud and a reconstructed camera pose set;
  acquiring a query image, and performing feature extraction on the query image to obtain a corresponding 2D feature point set; and
  performing image positioning according to the 2D feature point set, the 3D feature point cloud and the reconstructed camera pose set and based on a positioning attitude image optimization framework.

12. The non-transitory storage medium according to claim 11, wherein performing the pairwise feature matching on the plurality of images, and generating the corresponding eigen matrix according to the pairwise feature matching comprises:
  performing pairwise matching on the plurality of images according to the plurality of feature point sets, and storing feature point matching of each image pair; and
  estimating the eigen matrix based on matched feature point sets.

13. The non-transitory storage medium according to claim 11, wherein performing the 3D reconstruction according to the feature matching and the noise-processed eigen matrix and based on the ray model, to generate the 3D feature point cloud and the reconstructed camera pose set comprises:
  decomposing the noise-processed eigen matrix, to obtain relative attitude between a corresponding plurality of cameras;
  constructing a corresponding attitude image according to the relative attitude between the plurality of cameras and a plurality of feature points;
  acquiring models of the plurality of cameras, and defining corresponding ray models according to the models of the plurality of cameras;
  performing incremental reconstruction on the attitude image based on the corresponding ray models, to generate the 3D feature point cloud and the reconstructed camera pose set.

14. The non-transitory storage medium according to claim 13, wherein the method further comprises:
  establishing an index tree of each 3D feature point cloud in the 3D feature point cloud, and establishing an index tree of spatial positions for the plurality of cameras in the reconstructed camera pose set.

15. The non-transitory storage medium according to claim 14, wherein performing the 3D reconstruction according to the feature matching and the noise-processed eigen matrix and based on the ray model, to generate the 3D feature point cloud and the reconstructed camera pose set comprises:
  performing valid matching between the 2D feature point set and the 3D feature point cloud according to the index trees of the plurality of 3D feature point clouds, to obtain a bidirectional 2D-3D matching set;
  estimating the bidirectional 2D-3D matching set by a camera attitude estimation algorithm to generate an initial pose of the query image;
  performing a query in the reconstructed camera pose set according to the initial pose of the query image and the index tree of the spatial positions, to obtain adjacent images;

performing feature matching between the query image and the adjacent images, to obtain a corresponding plurality of valid matching sets;

generating relative attitude between the adjacent images according to the plurality of valid matching sets;

fusing the bidirectional 2D-3D matching set and the relative attitude between the adjacent images, to establish the positioning attitude image optimization framework; and performing optimization on the initial pose of the query image according to the positioning attitude image optimization framework, to implement the image positioning.

* * * * *